Nov. 21, 1933.  B. F. CONNER  1,935,942
METHOD OF MOLDING
Original Filed May 1, 1926
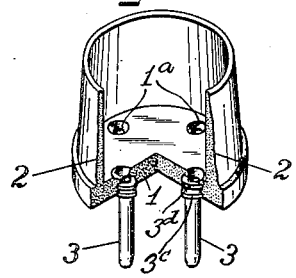
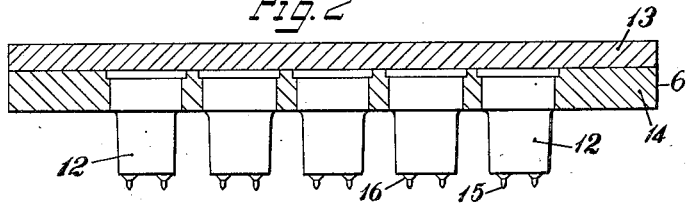
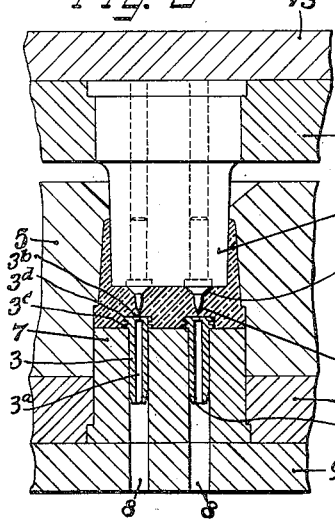
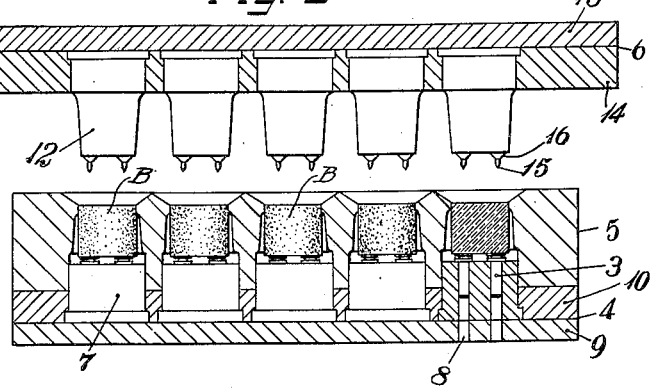
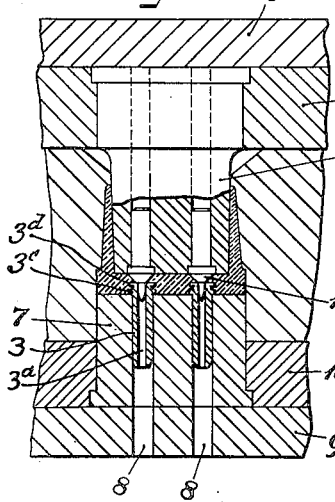
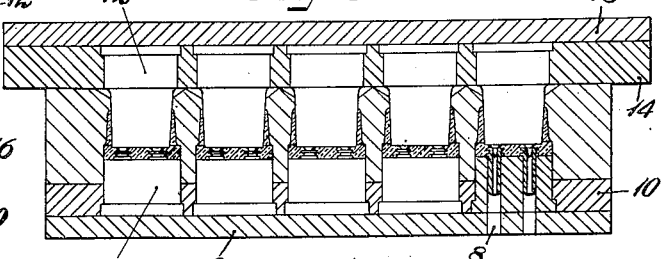
Inventor
Benjamin F. Conner
By S. Jay Teller
Attorney Patented Nov. 21, 1933

1,935,942

UNITED STATES PATENT OFFICE 1,935,942

METHOD OF MOLDING

Benjamin F. Conner, Wethersfield, Conn., assignor to Colt's Patent Fire Arms Manufacturing Company, Hartford, Conn., a corporation of Connecticut Application May 1, 1926, Serial No. 106,097
Renewed November 17, 1926

16 Claims. (Cl. 18—59)

The invention relates particularly to a method of molding primarily intended and adapted for making objects with preformed hollow inserts molded therein. While I do not necessarily limit myself as to the material which is to be molded, the method of molding is particularly useful for phenolic condensation compounds or equivalent materials. Materials of the class referred to will be herein designated as artificial resins.

I do not necessarily limit myself as to the particular objects to be molded but the invention is particularly applicable to the molding of bases for vacuum tubes. The bases for vacuum tubes are ordinarily cup-like in shape and a plurality of hollow metallic inserts project into or through the bottom. These inserts are adapted for the reception of wires extending from the tube proper.

According to the ordinary prior practice, bases formed from artificial resins have been molded separately from the inserts with holes in the bottoms to subsequently receive the said inserts. Thereafter the inserts, formed with holes extending entirely through them, have been inserted into the holes in the base, and the next operation has been to spread out or rivet over the inner ends of the inserts inside of the base so as to hold the said inserts in place.

This prior procedure has been expensive and has been subject to other objections. In addition to the matter of expense the prior practice has been open to the objection that the riveting operation sometimes breaks or cracks the base and sometimes fails to firmly hold the inserts. Another objection has been that the inserts upon being spread out or riveted over, have frequently, and in fact usually, split at one or more places. These splits or cracks in the inserts tend to catch the wires when the wires are inserted into the holes. This frequent catching of the wires requires added attention on the part of the operative and very greatly reduces the speed of the assembling operation.

To avoid the difficulties referred to, it has heretofore been proposed to mold the bases with the inserts molded in place. This has presented the difficulty that the phenolic condensation product or other material would flow into the holes in the inserts and plug them. To avoid this, arrangements have been made to temporarily place wires in the holes in the inserts with the expectation that these wires would prevent the material from entering the holes. Such attempts have not been successful as the material flows very easily and enters the holes to some extent notwithstanding the presence of the wires therein. It has also been proposed and practiced to provide inserts having their ends closed by thick integral walls and to mold these inserts in place. After the completion of the molding operation the base was removed from the mold and the said thick end walls were drilled to complete the openings through the inserts. This procedure is prohibitively expensive and is otherwise objectionable. With bases having their bottoms formed of glass and not of an artificial resin it has been heretofore proposed and practiced to mold in place inserts having their upper ends entirely open. In some cases dependence has been placed entirely upon the viscosity of the molten glass to prevent any considerable amount thereof from entering the inserts, and in other cases dependence has been placed upon depending prongs on the core portion of the mold adapted to enter and temporarily plug the openings in the inserts. Methods of molding utilizing open-ended pins have been limited in their utility to a viscous material such as molten glass for which the molding pressure is relatively low.

The principal object of the present invention is to provide a method of molding which makes it possible to satisfactorily mold vacuum tube bases or other similar objects with hollow inserts therein, which method is particularly applicable to and useful with artificial resins which are molded under high pressure and which during the molding operation become liquid and flow very readily. This object is accomplished by initially providing the inserts with thin walls which entirely close their inner ends and which therefore exclude the moldable material during the initial portion of the molding operation, and which are then pierced or removed preferably simultaneously with the later portions of the molding operation.

Further objects of the invention will be apparent from the drawing and the specification and from the claims.

Of the drawing,

Fig. 1 is a perspective view of a vacuum tube base such as may be molded in accordance with the invention, a portion being broken away to show the construction and mounting of one of the inserts.

Fig. 2 is a transverse vertical sectional view through the sections of a mold adapted for use in practicing the invention, these sections being shown in separated positions.

Fig. 3 is a transverse vertical sectional view showing the bottom and intermediate sections of the mold in assembled relation, but showing the top section separated.

Fig. 4 is a transverse vertical sectional view showing all three sections of the mold in assembled relation.

Fig. 5 is an enlarged fragmentary sectional view showing one of the inserts in place in the mold just before the mold sections reach their final closed positions.

Fig. 6 is a view similar to Fig. 5 but showing the mold sections in their final closed positions.

While the invention is not necessarily limited to the molding of a vacuum tube base, it is nevertheless particularly applicable for this purpose and in order that the invention may be fully understood the method of molding is shown and described in detail as required for molding this particular object.

A vacuum tube base such as may be molded in accordance with the invention is shown in perspective in Fig. 1. The exact design and proportions of the base may be varied according to requirements, but in general it is cup-like in shape having a flat or substantially flat bottom 1 and having a cylindrical or substantially cylindrical shell 2 projecting upward from the bottom. Projecting from the bottom are inserts 3, corresponding in number and position to the particular design of vacuum tube for which the base is intended. The inserts have longitudinal holes 3ᵃ extending entirely through them and adapted for the reception of wires which connect with the tube proper. Preferably, as shown, the bottom 1 is provided with conical recesses 1ᵃ which register with the ends of the inserts so that the ends of the wires may be more readily directed into the holes in the inserts 3 when the tubes proper are assembled with the bases.

As shown in Fig. 2, a mold adapted for carrying out my improved method preferably comprises three sections, 4, 5 and 6, which for the sake of convenience will be designated respectively as the bottom section, the intermediate section and the top section.

Projecting upward from the main upper surface of the bottom section are one or more cylindrical bosses 7, corresponding in number to the number of bases to be molded at one time. My invention is in no way limited to any particular number and in the drawing I have shown a row of five. The mold may comprise a single unit or one row or a plurality of parallel rows. Each of the bosses 7 is provided with vertical holes 8, 8 properly spaced and of the proper size to receive the inserts 3, 3 which are to be molded in place in the base.

As a matter of structural convenience the bottom section 4 preferably comprises two plates 9 and 10, the upper plate 10 having countersunk holes therein for the reception of collared cylindrical members which project upward to form the said bosses 7. The two plates 9 and 10 are fastened together, the plate 9 thus holding the members 7 against removal from the plate 10.

The intermediate section 5 of the mold preferably comprises a single plate with apertures 11 therein of the proper size and properly spaced to receive the bosses 7 when the section 5 is placed upon the section 4. The apertures 11 in the plate 5 are adapted not only to receive the bosses 7, but are also formed to constitute the exterior wall of the mold for determining the exterior shape of the bases to be molded.

The top section 6 of the mold comprises a plurality of depending core members 12 spaced to enter the apertures 11 in the intermediate section 5 and of the proper size to determine the interior size and shape of the bases to be molded. As a matter of structural convenience, the top section 6 comprises two plates 13 and 14, the plate 14 having counterbored apertures therein to receive the core members 12 which are correspondingly collared at their upper ends. The plates 13 and 14 are fastened together, the plate 13 thus serving to hold the core members 12 in place in the plate 14.

Each of the core members 12 is provided with a plurality of projections 15 corresponding in number and in spacing to the holes 8, 8 for the inserts 3, 3 located in the bosses 7. Each of the projections 15 preferably has a sharp prick point which is or may be of the same or approximately the same diameter as the hole in the corresponding insert. Preferably each of the projections is also formed with a conical portion 16 extending downward from the main body portion of the core member 12.

Each of the inserts 3 is initially formed with the longitudinal hole 3ᵃ therein terminating below the top thereof so as to leave a thin wall at the top which constitutes a part of the insert and which entirely closes the hole. Preferably as clearly shown in Fig. 5 the wall 3ᵇ is an integral part of the insert. The wall 3ᵇ is shown as being considerably thinner than the side walls of the inserts surrounding the hole 3ᵃ; but it will be understood that, while this relationship is sometimes advantageous, the invention is not necessarily so limited. Each insert 3 is formed at its inner end portion with means such as an enlarged head adapted to be embedded in the moldable material forming the body of the base. The inner end face of the enlarged head is continuous and imperforate throughout, and the said head has at least one shoulder facing longitudinally outward away from the said inner end face. For this purpose I prefer a plurality of external annular ribs, and as shown in the drawing there are two such ribs 3ᶜ and 3ᵈ. The lower annular rib 3ᶜ engages the top surface of the boss 7 and serves to support the insert.

In operating the mold and in carrying out my improved method, the inserts 3 are first put in place in the holes 8, 8 in the bosses 7, the other sections 5 and 6 of the mold being separated from the section 4. Fig. 2 shows the inserts in place with the ribs 3ᶜ resting upon the tops of the bosses 7.

The next step is to place the intermediate section 5 in assembled relation with the bottom section 4, as shown in Fig. 3. The required quantity of the phenolic condensation product or other moldable material in non-liquid form is then placed in each of the apertures 11. As illustrated, the material is shown as being in the form of small briquettes B, B, but the use of the briquettes does not constitute any part of the invention.

After the intermediate and bottom sections have been assembled as shown in Fig. 3, and after the briquettes have been put in place, the top section is brought into operative relation with the other sections and is slowly forced into its final position as shown in Fig. 4. It will be understood that the mold is heated while the top section is being forced into place, this heating being in accordance with the customary practice in molding phenolic condensation product and similar materials. In accordance with the invention and as already described, each of the inserts is formed with a thin wall 3ᵇ at the top which initially closes the hole 3ᵃ therethrough. This wall serves to prevent the moldable material from entering the hole 3ᵈ during the molding operation. After the molding operation is substantially complete, the wall 3ᵇ is pierced or removed so as to open the hole 3ᵈ, thus providing a hole through each insert which is entirely clean and free from moldable material. Preferably, as will now be described in detail, the piercing of the walls 3ᵇ is effected while the base is in place in the mold and ordinarily simultaneously with the completion of the molding operation. The term "pierce" is to be understood as meaning the making of a hole by the thrusting action of a prick point or punch, as contrasted with the making of a hole by the cutting action of a rotary tool.

As shown more clearly in Figs. 5 and 6, each of the prick points at 15 serves to pierce or break the thin wall 3ᵇ closing the end of the corresponding insert 3 and to open the hole 3ᵃ in the insert. The prick points are so located with respect to the other parts of the mold that the holes are opened just as the mold parts reach their final closed position. Thus the thin integral walls at the upper ends of the inserts prevent any of the material from entering the holes during the early stages of the molding operation. When the molding operation is nearly completed the prick points remove these thin walls, but the prick points at the same time serve to keep the holes closed and to positively prevent any material from entering them. The before-mentioned annular ribs 3ᶜ and 3ᵈ on the inserts serve to firmly hold them in place. Thus the inserts are molded in place and the holes therein are kept entirely free from the molded material.

The conical portions 16 adjacent the prick points serve to form the conical recesses 1ᵃ in the bottom of the base, and these recesses register exactly with the holes in the inserts. By referring to Fig. 6 it will be observed that when the mold parts are in their fully closed positions the outer or lower ends of the conical portions 16 are in approximate engagement with the upper or inner ends of the inserts 3. While the prick points at 15 serve to pierce and remove the thin walls of the inserts, the said conical portions do not in any way act upon the inserts but merely form the aforesaid conical recesses 1ᵃ. These conical recesses are of considerable assistance in the assembling operation as they serve to direct the ends of the wires on the tube proper into the holes.

I do not herein claim as a part of the present invention the herein-described contact pin or insert, the said insert being set forth and claimed in my copending application for Insert for vacuum tube base, Serial No. 147,205 filed November 9, 1926, as a division of this present application.

What I claim is:

1. The herein-described method of molding a base for a vacuum tube with a plurality of preformed hollow inserts in the bottom thereof and parallel with the axis thereof, the said method consisting in forming each of the said inserts with the inner end thereof closed by a thin wall constituting a part of the insert, locating the said inserts in the prescribed relation to the mold for the said base, placing moldable material in the mold, closing the mold to mold the desired base, and removing the said walls in the inserts to open the holes therein while the base is in place in the mold.

2. The herein-described method of molding an object with a preformed hollow insert therein, the said method consisting in forming the said insert with the inner end thereof initially completely closed by a thin wall constituting a part of the insert, molding the said object around the insert, and piercing the said thin wall to open the said hole in the insert while the said insert is in place in the moldable material.

3. The herein-described method of molding a base for a vacuum tube with a plurality of preformed hollow metallic inserts in the bottom thereof, the said method consisting in forming each of the said inserts with the inner end thereof completely closed by a thin metallic wall, locating the said inserts in the prescribed relation to the mold for the said base, placing moldable material in the mold, closing the mold to mold the desired base, and piercing the said thin walls to open the said holes in the inserts while the said inserts are in place in the moldable material.

4. The herein-described method of molding a base for a vacuum tube with a plurality of preformed hollow metallic inserts in the bottom thereof and parallel with the axis thereof, the said method consisting in forming each of the said inserts with the inner end thereof completely closed by a thin metallic wall, locating the said inserts in the prescribed relation to the mold for the said base, placing moldable material in the mold, closing the mold to mold the desired base, and piercing the said thin walls to open the said holes in the inserts while the said inserts are in place in the moldable material and while the base is in place in the mold.

5. The herein-described method of molding an object with a metallic insert embedded therein and having a central hole extending entirely therethrough, the said method consisting in providing an insert having the inner end of the hole therein initially closed by a thin wall which is a part of the insert, and simultaneously molding the said object around the insert and removing the said thin wall from its initial position to thereby complete the hole through the insert.

6. The herein-described method of molding an object with a metallic insert embedded therein and having a central hole extending entirely therethrough, the said method consisting in providing an insert having the inner end of the hole therein initially closed by a thin wall which is a part of the insert, and molding the said object around the insert and simultaneously removing the said thin wall from its initial position to thereby complete the hole through the insert while at the same time preventing the moldable material from entering the hole in the insert.

7. The herein-described method of molding an artificial resin object with a metallic insert embedded therein and having a central hole extending entirely therethrough, the said method consisting in providing an insert having the inner end of the hole therein initially completely closed by a thin wall which is a part of the insert, effecting molding of the said object around the insert by subjecting a quantity of non-liquid artificial resin material to heat and high pressure and thus reducing it to a liquid condition, and removing the said thin wall from its initial position at the end of the insert simultaneously with the aforesaid molding to thereby complete the hole through the insert while at the same time preventing the fluid artificial resin material from entering the hole in the insert.

8. The herein-described process of molding an object with a preformed hollow insert therein, the said process consisting in forming the said insert with the inner end thereof closed by a thin integral wall, and in simultaneously molding the said object around the insert and removing the wall to open the said hole in the insert.

9. The herein-described method of molding a base for a vacuum tube with a plurality of preformed hollow inserts in the bottom thereof and parallel with the axis, the said method consisting in forming each of the said inserts with the inner end thereof initially closed by a thin wall constituting a part of the insert, and simultaneously molding the said base around the upper ends of the inserts and removing the said walls to open the said holes in the inserts.

10. The herein-described method of molding an artificial resin base for a vacuum tube with a plurality of preformed hollow metallic inserts in the bottom thereof, the said method consisting in forming each of the said inserts with the inner end thereof closed by a thin wall constituting a part of the insert, effecting molding of the said base around the upper ends of the inserts by subjecting a quantity of non-liquid artificial resin material to heat and high pressure and thus reducing it to a liquid condition, and removing the said thin walls of the inserts simultaneously with the aforesaid molding to open the said holes in the inserts while preventing the fluid artificial resin material from entering the said holes.

11. The herein-described method of molding an object with a preformed hollow insert therein, the said method consisting in forming the said insert with the inner end thereof closed by a thin integral wall, locating the insert in a prescribed position with respect to a mold for the said object having thereon a prick point positioned to engage the said thin end wall of the said insert as the mold is closed, placing moldable material in the mold, and closing the mold to simultaneously mold the desired object and to cause the said prick point to pierce the said thin wall and thus open the hole in the insert.

12. The herein-described method of molding a base for a vacuum tube with a plurality of preformed hollow metallic inserts in the bottom thereof and parallel with the axis, the said method consisting in forming each of the said inserts with the inner end thereof closed by a thin metallic wall, locating the said inserts in the prescribed relation to a mold for the said base having on the core member thereof a plurality of prick points positioned to engage the respective thin end walls of the inserts as the mold is closed, placing moldable material in the mold, and closing the mold to simultaneously mold the desired base and cause the prick points to pierce and remove the said thin walls and thus open the holes in the inserts.

13. The herein-described method of molding a base for an artificial resin vacuum tube with a plurality of preformed hollow metallic inserts in the bottom thereof, the said method consisting in forming each of the said inserts with the inner end thereof closed by a thin metallic wall, locating the said inserts in the prescribed relation to a mold for the said base having on the core member thereof a plurality of prick points in register respectively with the said inserts and each adapted to engage and pierce the thin end wall of the corresponding insert, placing non-liquid artificial resin material in the mold, heating the mold, and closing the mold to thereby subject the said material to high pressure to reduce it to a liquid condition and thus effect molding of the said base around the upper ends of the inserts and to simultaneously cause the said prick points to pierce and remove the said thin end walls of the inserts while preventing entry of the artificial resin material into the holes therein.

14. The herein-described method of molding a base for a vacuum tube with a plurality of preformed hollow metallic inserts in the bottom thereof, the said method consisting in forming each of the said inserts with the inner end thereof closed by a thin metallic wall, locating the said inserts in the prescribed relation to a mold for the said base having on the core member thereof a plurality of projections in register respectively with the said inserts, each of the said projections including a conical portion adapted to form a conical recess in the bottom of the base and also including a prick point adapted to engage and pierce the thin end wall in the corresponding insert as the mold is closed, placing moldable material in the mold, and closing the mold to simultaneously mold the desired base with the conical recesses and to cause the said prick points to pierce and remove the end walls and thus open the holes in the inserts.

15. The herein-described method of molding a base for a vacuum tube with a plurality of preformed hollow metallic inserts in the bottom thereof, the said method consisting in forming each of the said inserts with the inner end thereof closed by a thin metallic wall, locating the said inserts in the prescribed relation to a mold for the said base having on the core member thereof a plurality of projections in register respectively with the said inserts, each of the said projections including a conical portion adapted to form a conical recess in the bottom of the base and also including a prick point adapted to engage and pierce the thin end wall of the corresponding insert, placing moldable material in the mold, and relatively moving the mold parts to a fully closed position in which the outer ends of the conical portions of the projections are in approximate engagement with the inner ends of the inserts and by such relative movement effecting the molding of the desired base with conical recesses therein and simultaneously causing the said prick points to pierce and remove the end walls of the inserts to open the holes therein.

16. The herein-described method of molding a base for an artificial resin vacuum tube with a plurality of preformed hollow metallic inserts in the bottom thereof, the said method consisting in forming each of the said inserts with the inner end thereof closed by a thin metallic wall, locating the said inserts in the prescribed relation to a mold for the said base having on the core member thereof a plurality of projections in register respectively with the said inserts, each of the said projections including a conical portion adapted to form a conical recess in the bottom of the base and also including a prick point adapted to engage and pierce the thin end wall of the corresponding insert, placing non-liquid artificial resin material in the mold, heating the mold, and relatively moving the mold parts to a fully closed position in which the outer ends of the conical portions of the projections are in approximate engagement with the inner ends of the inserts and by such relative movement applying high pressure to the material to thus reduce it to a liquid condition and effect the molding of the desired base with conical recesses therein and by such relative movement causing the prick points to pierce and remove the thin end walls of the inserts to open the holes therein.

BENJAMIN F. CONNER.